United States Patent
Ferguson

(10) Patent No.: US 6,719,213 B1
(45) Date of Patent: Apr. 13, 2004

(54) SPRAY BOOM

(76) Inventor: Edward P. Ferguson, 4103 66th St. SW., Fargo, ND (US) 58104

( * ) Notice: Subject to any disclaimer, the term of this patent is extended or adjusted under 35 U.S.C. 154(b) by 0 days.

(21) Appl. No.: 10/340,230

(22) Filed: Jan. 10, 2003

Related U.S. Application Data

(60) Provisional application No. 60/347,632, filed on Jan. 11, 2002.

(51) Int. Cl.$^7$ .................................................. B05B 1/20
(52) U.S. Cl. ....................... 239/166; 239/159; 239/165; 239/167
(58) Field of Search ................................. 239/166, 159, 239/165, 167, 163, 164, 168, 172, 722, 723, 730, 732

(56) References Cited

U.S. PATENT DOCUMENTS

| | | | |
|---|---|---|---|
| 3,904,118 A | * | 9/1975 | Farmery ..................... 239/165 |
| 4,039,147 A | * | 8/1977 | Hugg .......................... 239/167 |
| 4,044,952 A | * | 8/1977 | Williams et al. ............ 239/165 |
| 4,200,255 A | | 4/1980 | Schmidt et al. ......... 248/289 A |
| 4,449,667 A | * | 5/1984 | Tyler ........................... 239/167 |
| 4,854,503 A | * | 8/1989 | Little et al. ................. 239/167 |
| 5,000,385 A | | 3/1991 | Trusty et al. ................ 239/168 |
| 5,248,091 A | | 9/1993 | Thyberg ....................... 239/168 |
| 5,927,606 A | * | 7/1999 | Patterson ..................... 239/167 |
| 5,988,528 A | * | 11/1999 | Krohn et al. ................ 239/168 |
| 5,992,759 A | * | 11/1999 | Patterson ..................... 239/167 |
| 6,027,039 A | * | 2/2000 | Mercil ......................... 239/159 |
| 6,293,475 B1 | * | 9/2001 | Sobolik ....................... 239/168 |

* cited by examiner

*Primary Examiner*—Michael Mar
*Assistant Examiner*—Darren Gorman
(74) *Attorney, Agent, or Firm*—Westman, Champlin & Kelly, P.A.

(57) ABSTRACT

An agricultural boom is made up of two sections connected together, including an inner boom section and an outer boom section that are joined together with a hinge assembly in mid portions of the boom. The outer boom section is mounted to the inner boom with a linkage and control cylinder that provides for a knee action, that permits the outer boom section to be raised and lowered. The boom sections are both mounted about upright axes, and are supported against downward loads by separate pairs of cables that have ends joined at the base of the respective boom section at spaced points and connected to the outer or free ends of the respective boom sections at common points. The cables permit the boom sections to pivot about their respective upright axes with one of the cables carrying tension loads and causing the outer or free ends of the boom sections to raise while the other cable becomes slack.

11 Claims, 10 Drawing Sheets

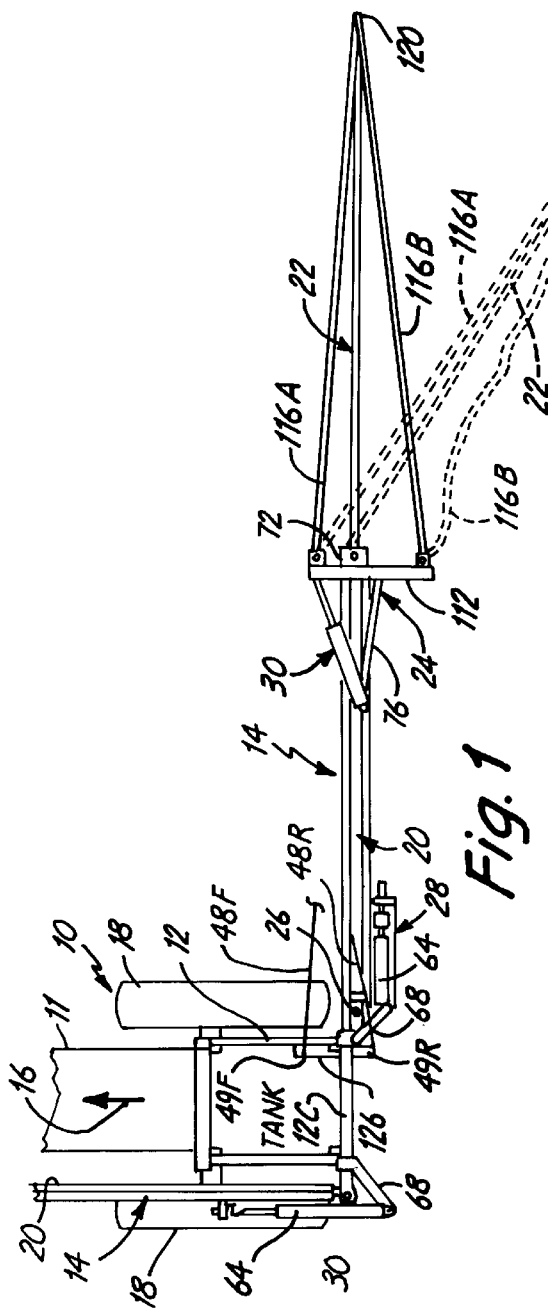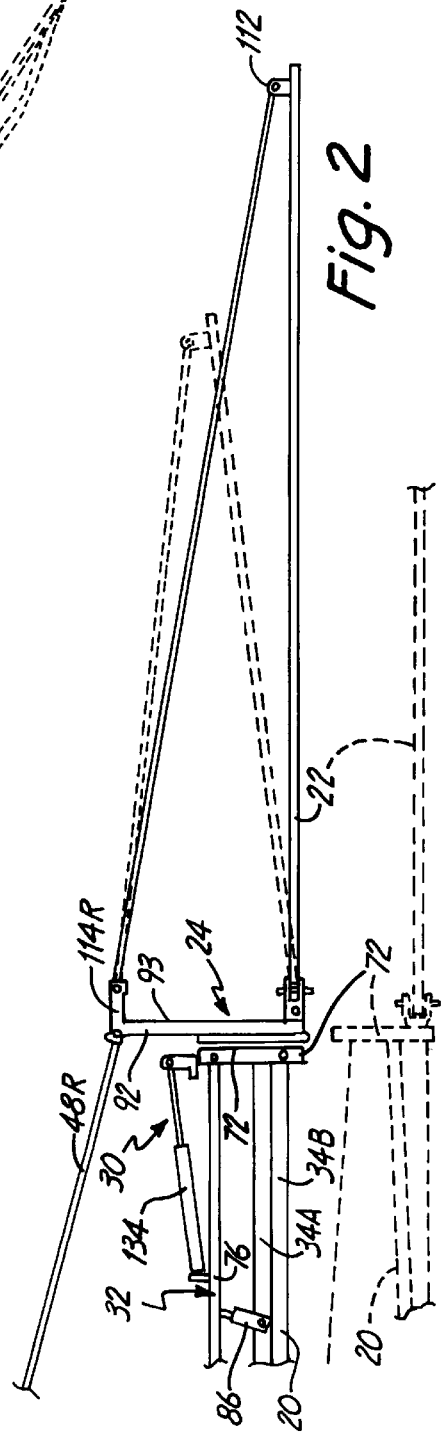

SPRAY BOOM

This application refers to and claims priority from U.S. Provisional Application Ser. No. 60/347,632, filed Jan. 11, 2002, the content of which is incorporated by reference.

BACKGROUND OF THE INVENTION

The present invention relates to a foldable elongated agricultural sprayer boom for field spraying applications, which provides reliable breakaway structure for permitting an outer section of the boom to pivot relative to an inner section to clear obstructions. The outer section also can be folded back alongside of the inner section. The entire boom will fold forwardly for transport. The inner section of the boom is a composite structure that is lightweight, torsion resistant, and high strength.

Foldable field sprayer boom assemblies used for spraying fields have been used for many years. With larger and larger fields, it is desirable to have the booms as long as possible. Problems are inherent in using such booms since there are obstructions that the outer sections of the boom might strike, so the booms generally are made in more than one section with outer sections being capable of pivoting out of the way of obstructions. Also, the outer sections fold back along the inner sections and the entire boom then folds for transport.

Also, when long booms are used, torsional rigidity is from shock loads caused by uneven ground and the like.

Many agricultural sprayers use breakaway sections for hinging the outer boom section to the inner boom section, for example, U.S. Pat. No. 5,428,091 illustrates such a breakaway boom.

SUMMARY OF THE INVENTION

The present invention relates to an agricultural sprayer boom made in at least two separate boom sections, which are hinged together at a desired location. The hinge between the inner section of the boom and the outer boom section is provided with a hydraulic cylinder control that is mounted to a floating or knee action linkage that permits the outer section boom to be raised and lowered at the mid point of the boom, and which will dampen the shock loads from the vehicle traversing rough or uneven ground. The hinge used for coupling the boom sections and mounting the hydraulic cylinder that controls the pivoting of the hinge permits folding of the outer boom section. The outer boom section folds back along side the inner boom section.

The outer end of the outer boom section is also supported on the inner boom section in a manner which permits the outer boom section to pivot to clear obstructions that it may strike, by utilizing a pair of suspension cables extending from a T-shaped upright bracket at the hinge at the inner end of the outer boom section. The cables carry tension load, and prevent the outer boom section from sagging when in use, and will maintain the outer boom section in a horizontal position. When the outer boom section engages an object during travel, the outer boom section will pivot about an upright axis, and as it pivots, one of the cables will be placed under greater tension, and the other cable will become slack, automatically. As the outer boom section pivots about the upright axis, the geometry is such that the outer end of the outer boom section will be caused to rise by the cable as the outer end moves through an arc about the upright pivot axis at its inner end. In this manner, the outer boom section will slide around and tend to rise over obstructions at the same time. The outer boom section will pivot to clear an obstruction a full 90° while supported by one or the other of the cables.

The spray boom is mounted onto a frame on a movable support, which can be a self-propelled vehicle or a towed trailer. The frame that mounts the boom can be raised and lowered so that the inner boom section will be raised. When the boom sections are to be folded for transport, the outer boom section is folded back alongside the inner boom section, using the hydraulic cylinder that controls the hinge that permits such pivoting. Also a second hydraulic cylinder is used for moving the inner boom section about an upright pivot to a folded position. The inner boom section also has a tension cable support connected from the frame to the T-bracket at the outer end. The cable is mounted so it causes the outer end of the inner boom section to tilt upwardly so that it nests close to the side of the supporting frame and vehicle.

It is also to be understood that there are folding boom sections extending from opposite sides of the supporting frame or vehicle, and each one is a mirror image of the other. Stated another way, there are two of the inner boom sections and mounted to the opposite sides of the support frame, and each of the inner boom sections will support an outer boom section as described.

BRIEF DESCRIPTION OF THE DRAWINGS

FIG. 1 is a fragmentary schematic top plan view of a field sprayer having a boom made according to the present invention installed thereon;

FIG. 2 is a fragmentary rear view of the outer boom section of FIG. 1 and its support shown schematically;

DETAILED DESCRIPTION OF THE PREFERRED EMBODIMENTS

Figure 3:
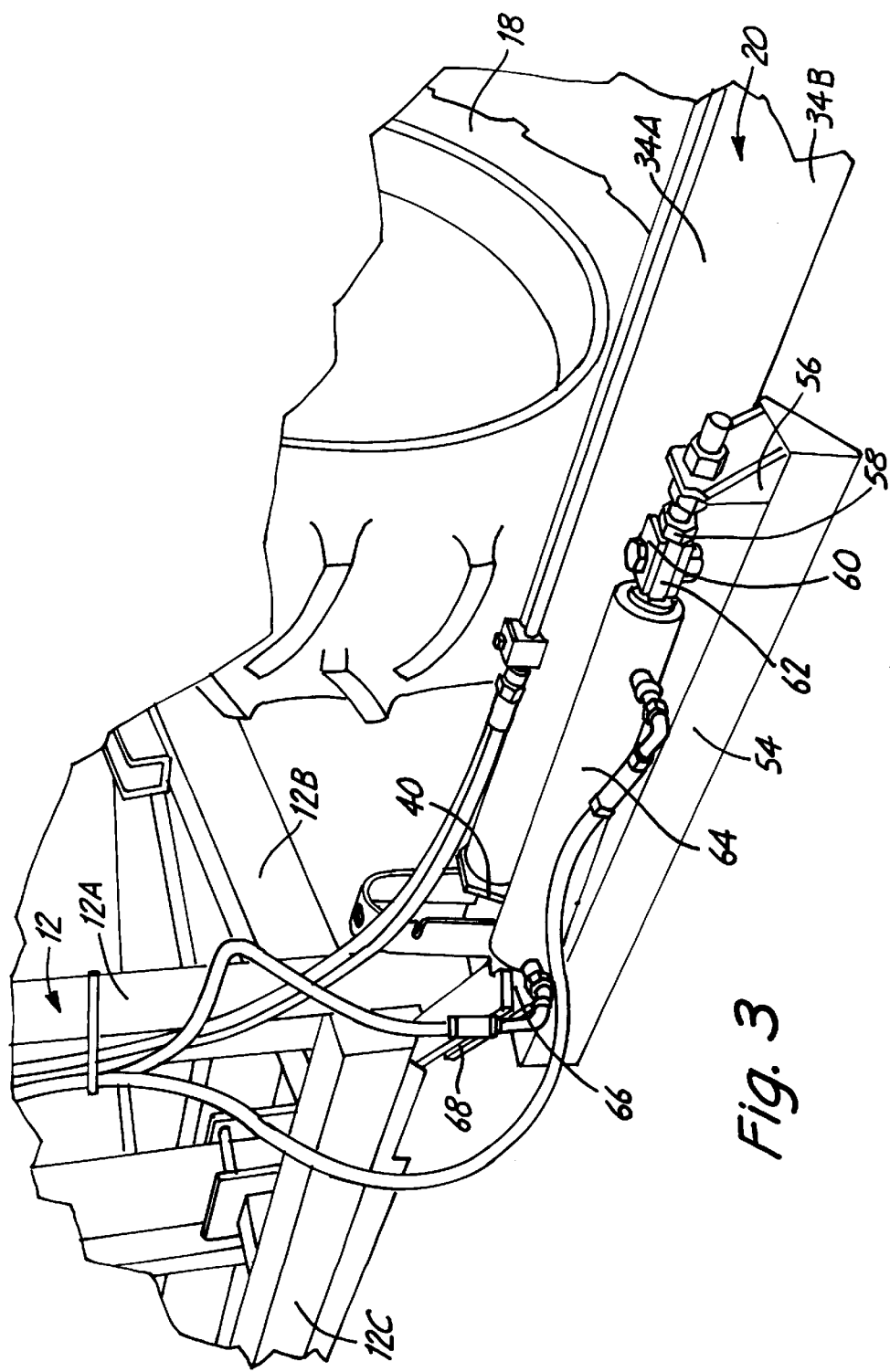
FIG. 3 is a perspective view of a base end of an inner boom showing a hydraulic cylinder for controlling pivoting of the boom for transport.

An agricultural sprayer indicated generally at 10 is mounted on a trailer or a self-propelled vehicle 11 that supports a main support frame 12 that has a rear portion. The rear portion of frame 12 supports a pair of foldable boom assemblies 14, shown extended on the right hand side of the vehicle 11 and folded for transport on the left hand side. The direction of travel of the vehicle is indicated by the arrow 16.

The right hand foldable boom assembly 14 will be explained. The left hand boom assembly is a mirror image of the right hand boom assembly. The boom assembly 14 has an inner boom section 20, and an outer boom section 22 that are hinged together with a controllable hinge assembly 24 in the central portions of the boom assemblies. The inner boom section 20 is mounted for pivotable movement about an upright pivot 26 at its base end, and it is controlled for pivoting about this axis with a hydraulic cylinder and link assembly 28.

The folding of the hinge for outer boom section 22, as well as providing the ability of the outer boom section to "float" is controlled with a hydraulic cylinder assembly 30 that is mounted onto a type of linkage frame 32 (FIG. 2) that acts as a control of a four bar linkage as shown in FIG. 2 and in other figures. The mounting to the rear of frame 12, which can be raised and lowered as shown, permits raising and lowering the boom assembly while the boom assembly remains parallel to the ground.

Figure 11:
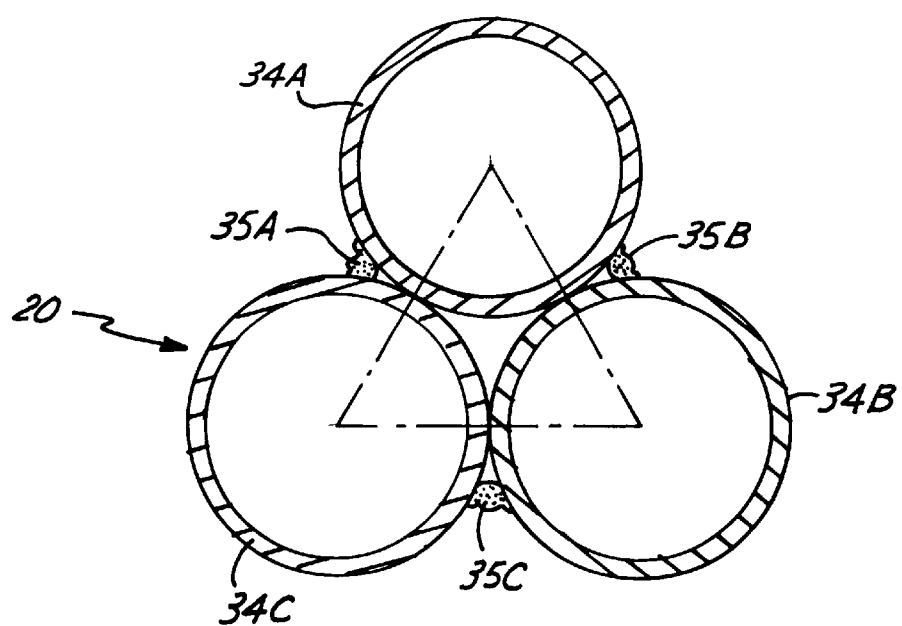
FIG. 11 is a sectional view of the inner boom section taken on line 11—11 in FIG. 9.

The inner boom section 20 is made of three tubes 34A, 34B and 34C stacked together so their central axes form a triangle in cross section (see FIG. 11). The tubes 34A, 34B and 34C are welded together with welds shown at 35A, 35B and 35C, respectively, so that the tubes make a very rigid assembly, that is lightweight, and can withstand high torsional loads for the amount of weight. The triple tube inner boom section can withstand loads so that it can have lengths in the range of 25 feet or more. As can be understood, the torsion loads on the inner boom section become high when the outer boom section is extending perpendicular to the length of the inner boom section as the outer boom section is being folded back to be parallel to and adjacent to the inner boom section.

Figure 12:
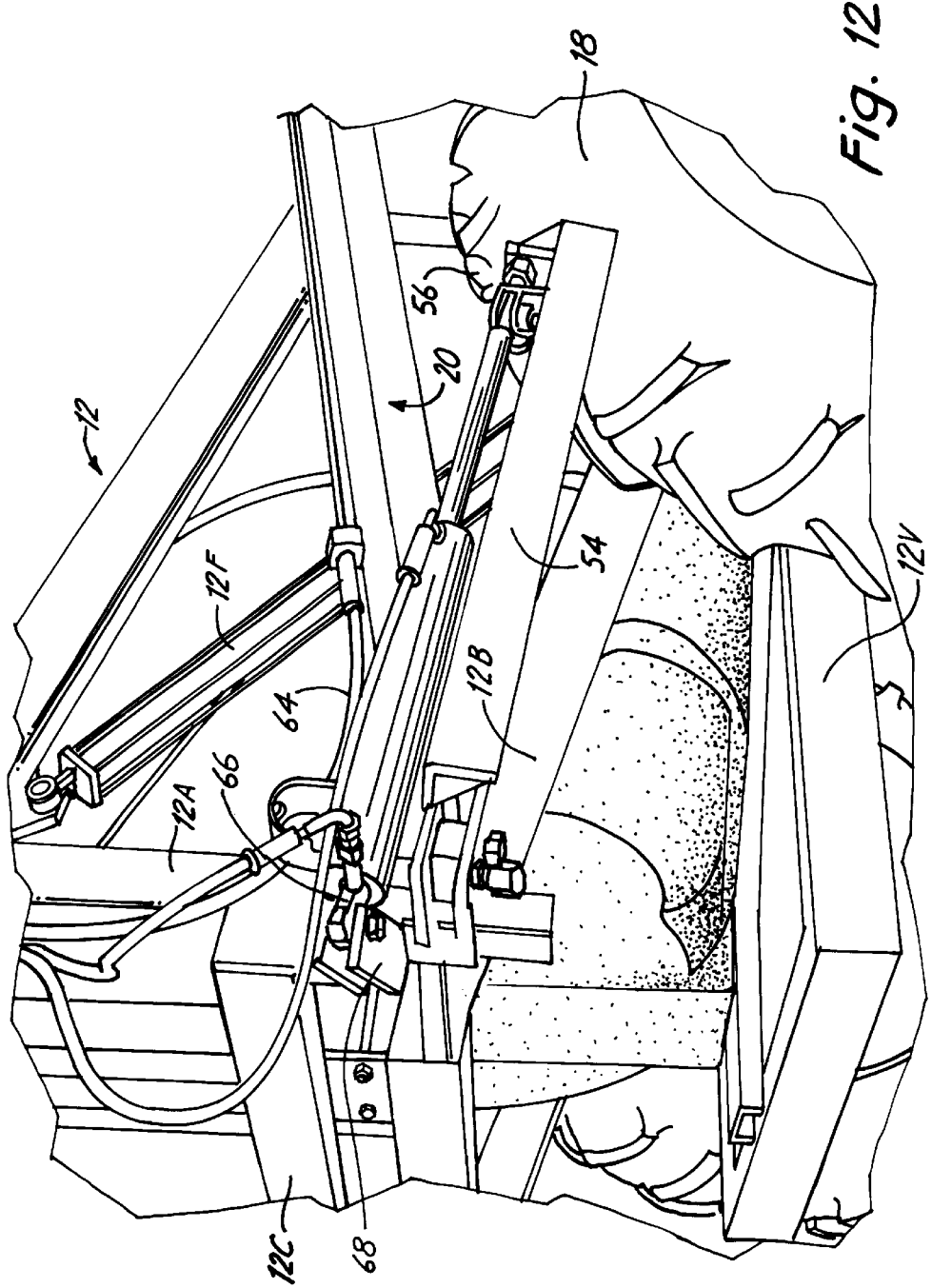
FIG. 12 is a fragmentary perspective view of the support frame raised and the boom folded.
Figure 13:
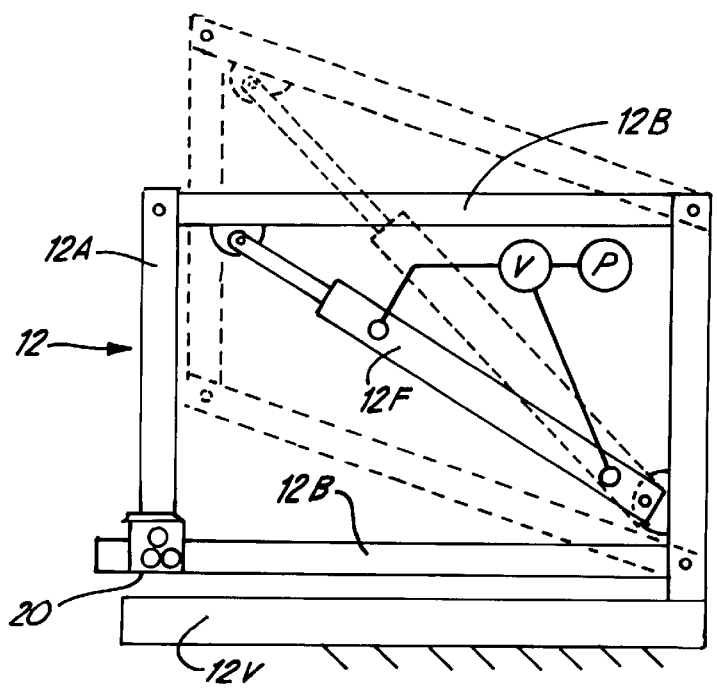
FIG. 13 is a schematic view of a bracket for supporting the inner boom section support cables on the support frame.

As shown in FIGS. 3, 7 and 8, and FIGS. 13 and 14 schematically, the main support frame 12 has front and rear upright corner posts 12A (four posts), and horizontal side members 12B that are pivoted to the posts 12A on both sides of the frame. The posts at the front and rear are joined together with cross members 12C. The front posts are fixed to the trailer or vehicle frame 12V. The pivoting side members 12B of frame 12 permits the rear of the frame to be raised and lowered like a four-bar linkage or parallelogram linkage, through the use of hydraulic cylinders, as shown schematically in FIGS. 12 and 13. One cylinder is shown at 12F, and while the particular main support frame for mounting the folding boom does not form any part of the invention, the raising of the frame as shown in FIGS. 12 and 13 will provide for raising and lowering the boom assembly when spraying and provide clearances when the boom sections are folded forward. The frame 12 can be a fixed frame for a truck mounted sprayer and the showing of frame 12 is only one example of the support frames that can be used.

The inner boom section 20 is welded to an end plate 40 adjacent pivot 26, and plate 40 is also welded to side plates 42 (see FIG. 8) that are welded to the inner boom 20. The side plates 42 have openings that align with a pivot tube 44 that is welded to a pivot plate 46. A pin 42A is used for pivotally mounting the inner boom to the pivot plate 46 about a generally horizontal axis.

Figure 6:
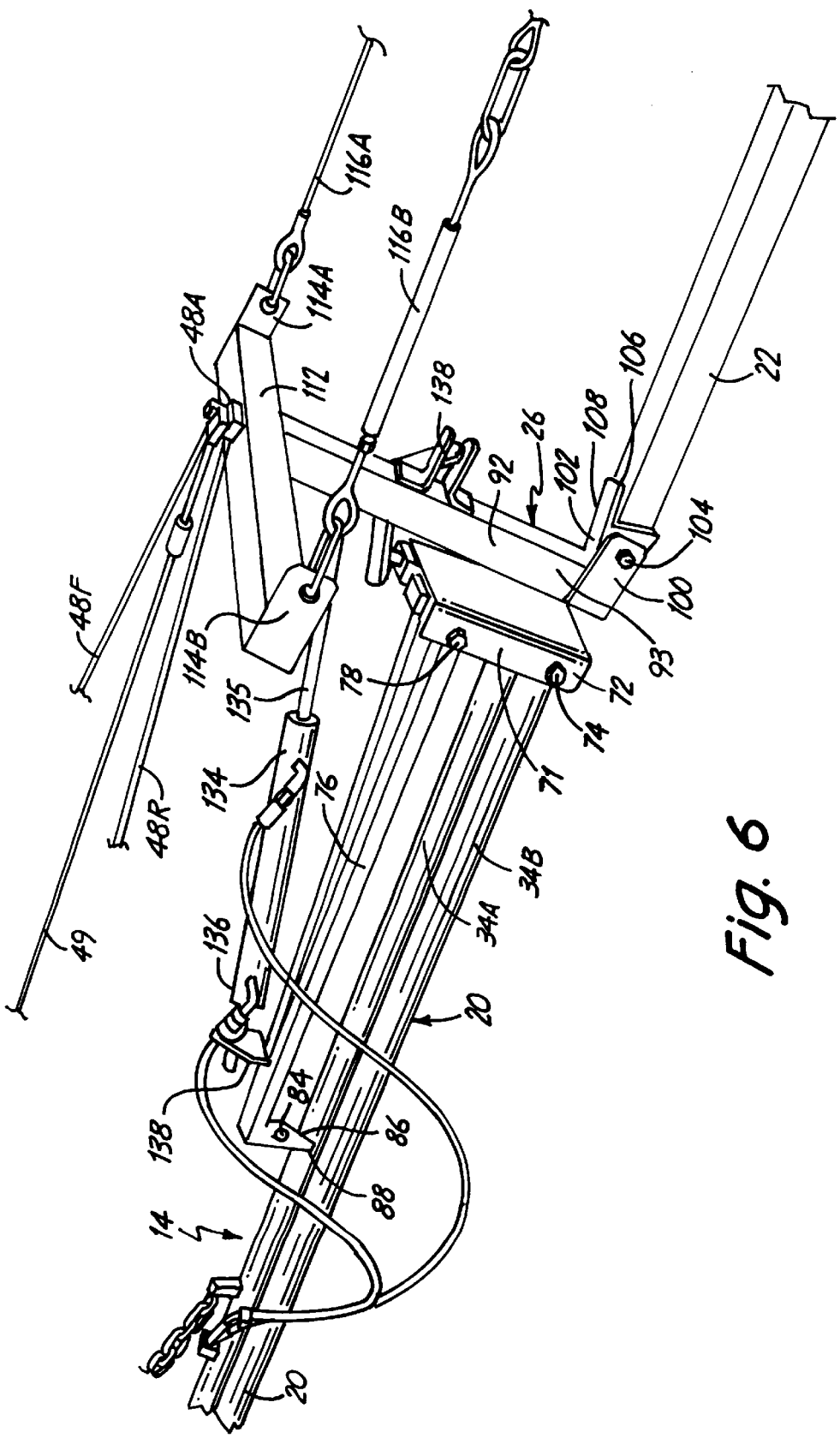
FIG. 6 is a perspective view of the outer end of the inner section of the boom assembly from the front side of the hinge between the inner and outer boom sections.
Figure 14:
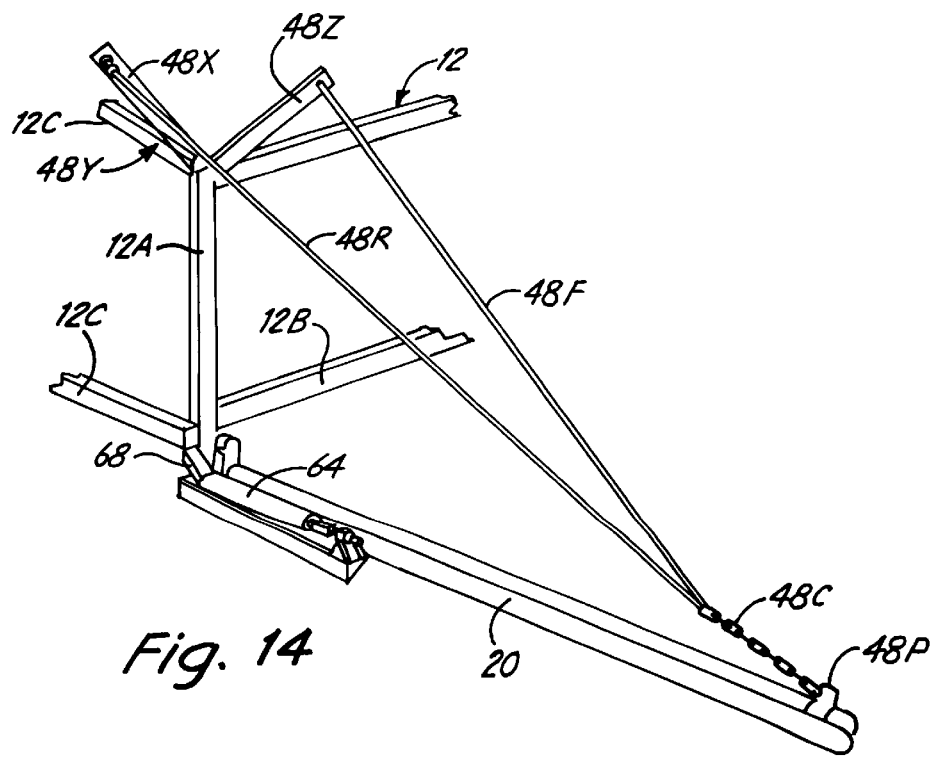
FIG. 14 is a schematic representation of the frame for supporting the boom and support cables for the inner boom section.

The inner boom is held in a generally horizontal position through the use of a pair of cables 48F and 48R (shown partially in FIGS. 1 and 6) that are both connected to a chain 48C and to a bracket 48P on the inner boom section, as shown in FIG. 14. The cables 48F and 48R are connected to a suitable bracket 48Y having arms 48X and 48Z extending upwardly from the frame 12 to support points that are spaced in fore and aft directions as shown schematically.

Figure 7:
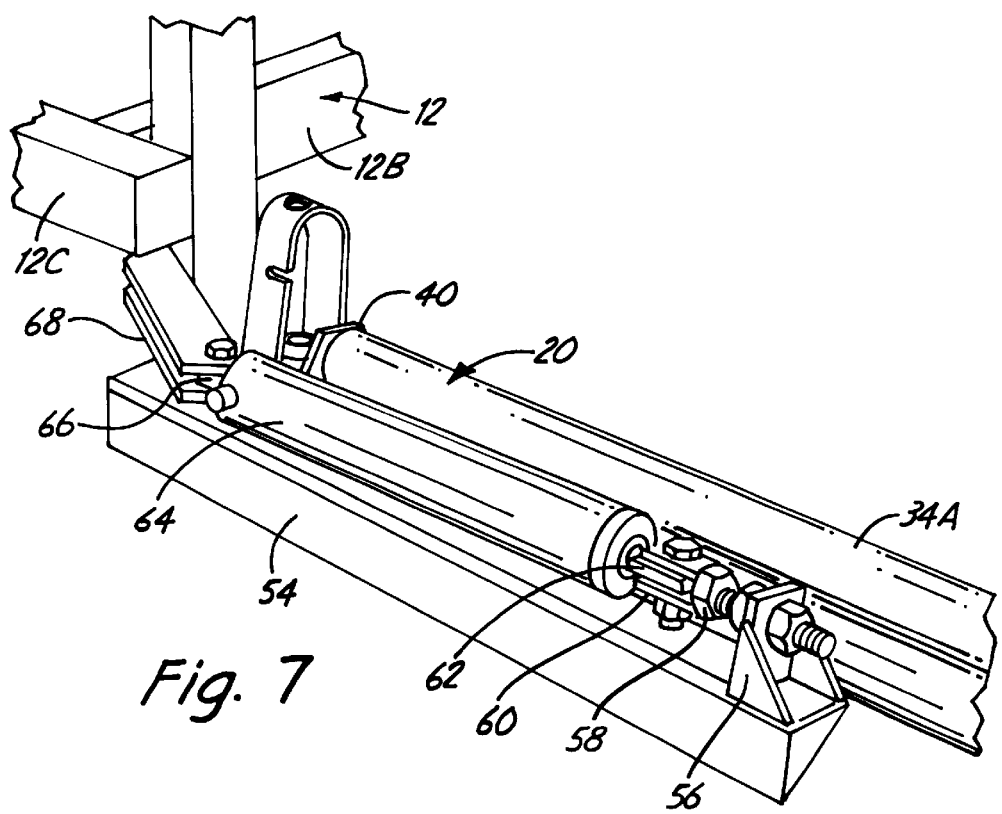
FIG. 7 is a perspective view of the mounting of the inner boom section relative to the support frame.
Figure 8:
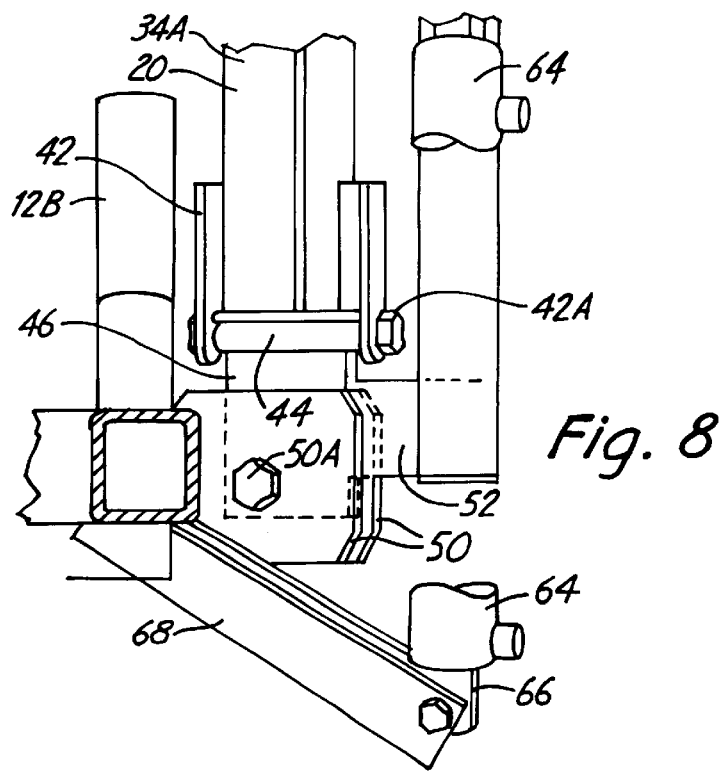
FIG. 8 is a top view showing the inner boom mounting in a forward folded position.

FIG. 8 shows the pivot plate 46 in place between two support plates 50 that are fixed to the frame 12, and the pivot plate 46 has an outwardly or laterally extending arm 52 that supports a cylinder mounting leg 54 which is also part of and moves with the pivot plate 46. The mounting leg 54 extends alongside of the inner boom section 20 and has an upright support 56 at its outer end (FIG. 7). An adjustable threaded rod 58 extends through an opening in the support 56 and carries a clevis type bracket 60 into which the rod end fitting 62 of a hydraulic cylinder or actuator 64 is mounted. The actuator 64 has a base end bracket 66 that fits between a pair of arms 68 that in turn are fixed to the frame 12, and extend laterally outwardly therefrom at an angle, as can be seen in FIGS. 1, 7 and 8. The pivot bracket 46 is mounted with a pin 50A to the plates 50. The pin 50A forms the pivot 26. Cylinder 64 is a double acting hydraulic cylinder that can retract and extend a rod and the cylinder 64 controls the position of the inner boom section about the pivot 26.

The outer end of the triple tube inner boom section 20 supports the hinge assembly 24 for connecting the outer boom section to the inner boom section. Referring to FIGS. 4, 5, 6, 9 and 10, the specific arrangement of this hinge assembly 24 can be seen. The inner boom section 20 has a fixed end bracket 70 at its outer end that is welded to the ends of the tubes 34A, 34B and 34C, and the bracket 70 extends between the legs 71 of a channel shaped "knee action" link or plate 72. The plate 72 is pivotally mounted with pins 74 to the end bracket 70 and thus to the inner boom section. The plate 72 forms the base for the hinging support for the outer boom section 22. The channel shaped plate 72 has a control link 76 pivotally mounted thereto with pins 78, for pivoting about axis parallel to the axis of pins 74, and on the same legs 71 of the channel 72. The control link 76 is a wishbone shaped link, and has a base end 80 that has a depending arm 82 that is pivotally mounted with a pin 84 to a pivoting link 86. The link 86 is pivotally mounted with a pin 88 to the upper tube 34A of the triple tubes of the inner boom section 20.

Figure 10:
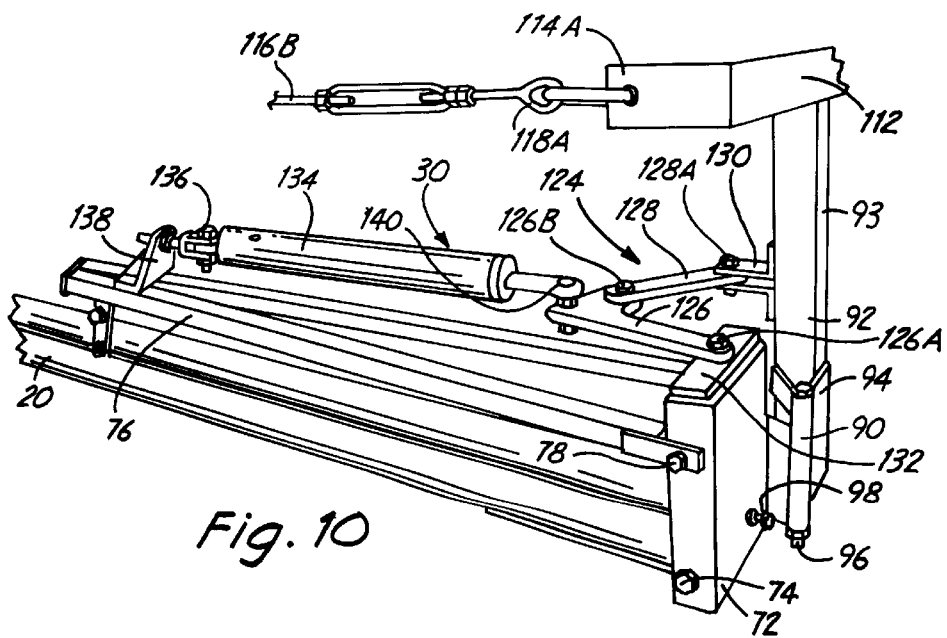
FIG. 10 is a view of the hinge similar to FIG. 9 but with the outer boom section folded rearwardly against the inner boom section.

The plate 72, as can be seen in FIG. 10 for example, has a hinge member 90 that is used for supporting a T-shaped upright cable anchor bracket 92 that has an upright post 93 and a top cross member 112. The post 93 of bracket 92 is fixed to hinge members 94 that mate with the hinge 90 and a hinge pin or bolt 96 is used for forming a pivot for hinge member 94 and the bracket 92 about a generally upright pivot axis. The axis of bolt 96 has an axis parallel to the plane of the main portion of the plate 72. As can be seen in FIG. 10 an adjustable stop bolt 98 is threaded into a nut welded to plate 72 and can be used for limiting or adjusting the stopped position of the hinge member 94 about the upright axis of pivot pin 96 relative to plate 72 to keep the outer boom section oriented.

Figure 9:
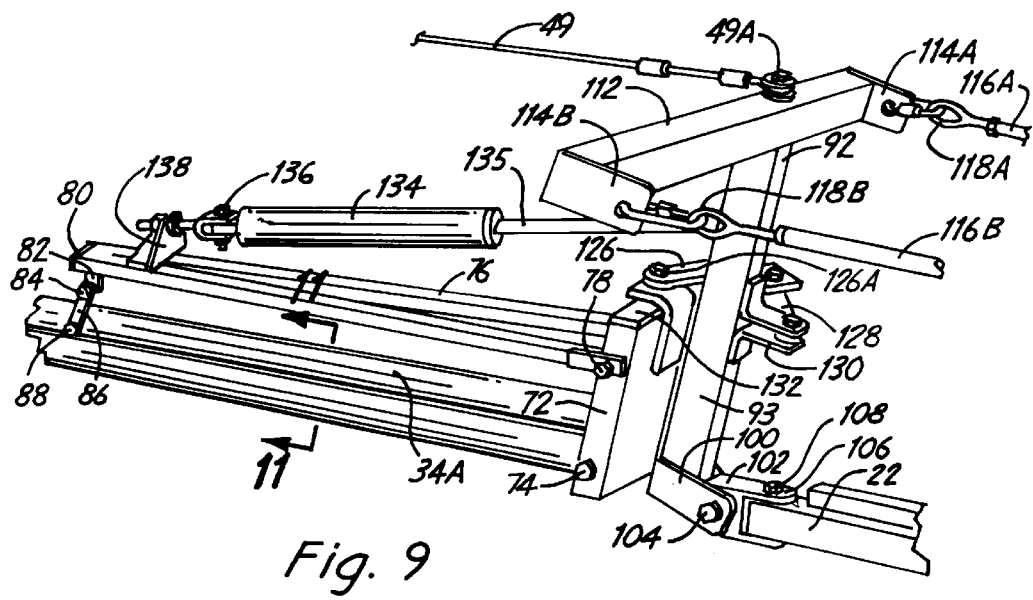
FIG. 9 is a perspective view of the hinge between the inner boom section and the outer boom section similar to FIG. 6.

The T-shaped bracket 92 is used for mounting the outer boom section 22. As can be seen in FIG. 9, the lower end of upright post 93 of bracket or support 92 has a pair of straps or arms 100 extending outwardly therefrom, and these arms 100 in turn pivotally mount a outer boom support hub 102 about a horizontal pivot using a pivot bolt or pin 104.

The hub 102 also has spaced arms such as that shown at 106, and the arm 106 receives the single tube outer boom section 22 and pivotally mount the outer boom section about an upright axis with a pin 108. The outer tube section 22 can have a reinforcing or backbone tube 22A thereon, but it is a relatively lightweight square tube as shown.

The T-shaped support or bracket 92 has a cross member 112 at the upper end of the post 93 thereof, and the cross member 112 extends in a direction perpendicular to the extension of the outer boom section 22. The cross member 112 is positioned in a desired location relative to the central axis of the upright post 93 of the T-shaped support 92, so that ears 114A and 114B are at the outer ends of the cross member 114 at the desired locations relative to the outer boom section pivot axis. The outer end of the outer boom section is supported about the pivot bolt 104 by cables 116A and 116B that are attached to the ears 114A and 114B through suitable fittings 118A and 118B (FIG. 9). The cables 116A and 116B are tension carrying cables, and are secured in a suitable manner to the outer boom section at a point 120 shown in FIG. 2. The connection point 120 is spaced inwardly a desired distance from the extreme outer end of the outer boom section. The cables 116A and 116B are of size so that they will support the weight of the outer boom. The weight or moment of both the inner and outer boom sections about the pivot 42A is carried back to the main support frame 12 by the pair of cables 48F and 48R, which are connected by a chain to a bracket on the inner boom section 20 as shown at 48A. The cables 48F and 48R are oriented like the cables 116A and 116B so when the boom is pivoted forwardly on about the pivot 26, the outer end of the inner boom will raise.

An additional cable 49 (FIG. 9) is connected from frame 12 to help control the plate 72 as shown by connecting the outer end t the top center of post 93, at 48A. This cable 49 forms a top link of a four bar linkage support for the boom assembly. The inner boom section 20 forms one bar between pivot pin 42A and pivot 74, where the inner boom section connects to the plate 72, and thus to the post 93 and top cross member 112, which together form a second link. The plate 72 and post 93 of bracket 92 are controlled as to their pivoting about pivot bolt 74 by the cable 49 which forms the top link, between frame 12 and plate 72. The vertical members of frame 12 form the base link between pivot 42A on the bracket 46, and the top of frame 12 where the inner end of cable 49 is secured.

The vertical position of the boom assembly 14 is controlled by raising and lowering frame 12. The orientation of the inner boom section, the plate 72 and cable 49 relative to the support frame 12 causes the boom to remain parallel as it is raised and lowered. The cable 49 is in addition to cables 48F and 48R. When the boom is extended and strapped out, the cables 48F and 48R do not affect the linkage action of cable 49. The cables 48 and 49 tend to keep the inner boom section extending outwardly perpendicular to the frame 12.

Figure 4:
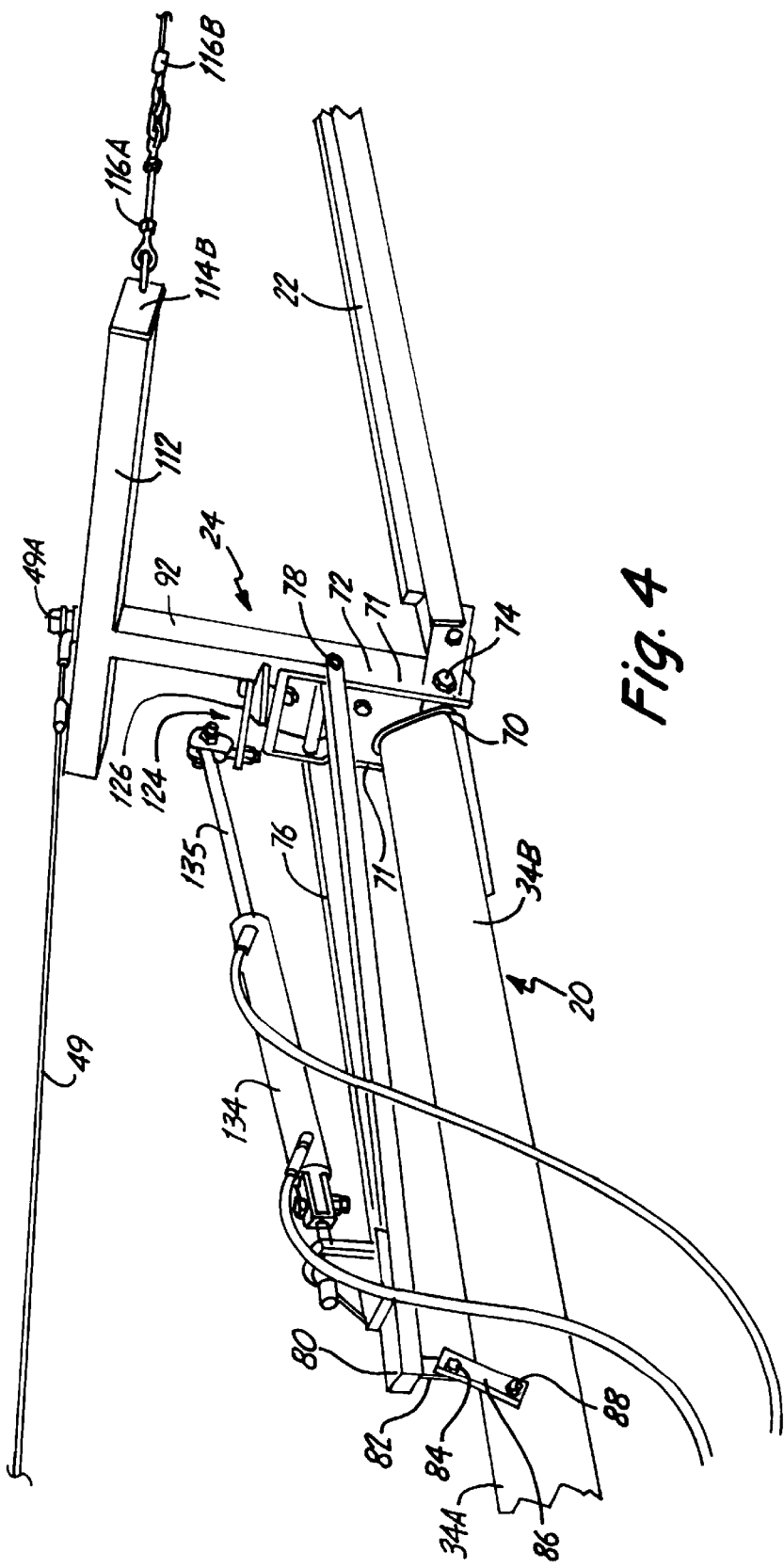
FIG. 4 is a perspective view of the hinge region between the inner and outer boom sections made according to the present invention.
Figure 5:
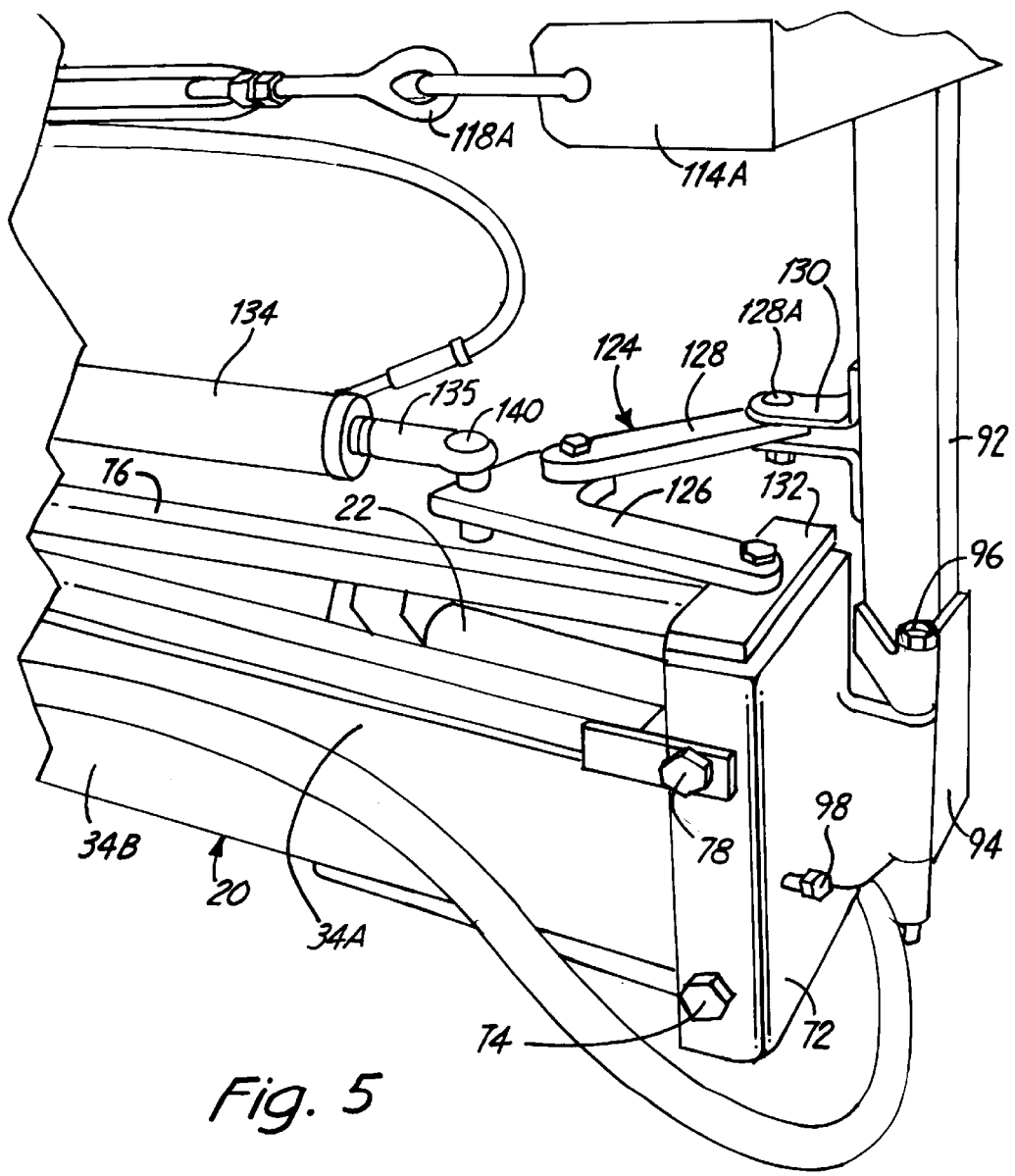
FIG. 5 is a perspective side view of the outer end of the inner boom section after the outer boom section has been folded back adjacent the inner boom section.

The pivoting of the bracket or support 92 about the axis of the pivot pin or bolt 96 is controlled with a folding linkage indicated generally at 124 (FIGS. 4, 5 and 10). The folding linkage 124 includes a bell crank 126, a connecting link 128, and a bracket 130 that is attached to the upright post 93 of the bracket 92. The bell crank 126 is pivoted as at 126A to a cross plate 132 at the upper end of the knee action plate 72, and is also pivoted to one end of link 128 with a pin 126B (FIG. 10). The opposite end of link 128 is pivoted to the ears or bracket 130 with a pin 128A.

The linkage that is shown is made with suitable length links so that the bracket 92 can be rotated 180° from the position of FIG. 9 with the outer boom section extending straight out from the inner boom section, to a position where the outer boom section is folded alongside the inner boom section as shown in FIG. 10.

The cylinder assembly 30 includes a hydraulic actuator or cylinder 134 that is used for controlling the linkage. The cylinder 134 has a base end connected as at 136 to a bracket 138 fixed to the wishbone control link 76, and has its rod end mounted with a pin 140 to the bell crank 126 at a location spaced from both the pivot pin 126A and the pivot pin 126B.

When the cylinder 134 is retracted, the outer boom section is folded to the position shown in FIG. 10 and extends back along the inner boom section 20, so that the outer end of the outer boom section is adjacent to the support frame. When the cylinder 134 is extended partially, it will pivot the hinge member 94 and the support 92 to a position shown in FIG. 9, with the outer boom section 22 extending essentially along the same axis as the inner boom section 20, which is the working position for the sprayer boom 14.

The boom assembly will be able to move between a position contacting the ground by lowering frame 12, to a normal operating position where the inner boom section is raised above growing crops.

When the outer boom section 22 is folded back, to be parallel to and adjacent the inner boom section 20 as shown generally in FIG. 10, by retracting the rod of the cylinder 134, then the inner boom section can be folded forwardly along the sides of frame 12 and vehicle or trailer 10 as well, by operating the actuator or cylinder 64. When the cylinder 64 has its rod end extended, the entire boom, including both the inner and outer boom sections will pivot about the post axis 26 formed by the pin 50A, and the pivot plate 46 will move to a position substantially 90° from the normal working position. As this is done, the cable 48R will cause the outer end of the inner boom section to raise since it is anchored on an arm 48X that extends to the rear of the pivot axis 26. The cable 48F will slacken. The boom assembly tilts up about the pivot axis of pin 42A (FIG. 8). At the same time, the frame 12 can be lifted as shown in FIGS. 12 and 13, to provide for clearance of wheels or the like on the supporting vehicle. The boom can be moved to overlie a mechanical rest frame and then by lowering the frame 12 the free end of the boom will rest on a fixed support for transport.

Again, the showing of FIG. 13 and other showings of the frame are illustrative only and many other types of supporting frames can be used.

Although the present invention has been described with reference to preferred embodiments, workers skilled in the art will recognize that changes may be made in form and detail without departing from the spirit and scope of the invention.

What is claimed is:

1. An agricultural sprayer boom comprising an inner boom section and an outer boom section connected together in a mid portion, and in an operating position the inner and outer boom extending along the same longitudinal axis horizontally extending, a plate fixed to an outer ends of the inner boom section, a vertical pivot transverse to the longitudinal axis between the plate and the outer boom section for permitting the outer boom section to pivot about a vertical axis, a second vertical axis pivot between the plate and the outer boom section, and a linkage to normally retain the outer boom section in a working position, and permit movement of the outer boom section about the second vertical axis pivot when a horizontal load is applied to an outer end of the outer boom section.

2. The agricultural sprayer boom of claim 1, wherein an inner end of the inner boom section has a pivot bracket mounted thereon, a support frame for supporting the inner end of the inner boom section, the pivot bracket pivotally mounting both of the boom sections about a generally horizontal axis transverse to the longitudinal axis relative to the support frame.

3. The agricultural sprayer boom of claim 1, wherein the vertical pivot is positioned to permit the outer boom section to fold about the pivot such that in a folded position the outer boom section is adjacent to the inner boom section, the outer boom section moving through an arc that increases the torsional load at the outer end of the inner boom section as it moves to its folded position.

4. An agricultural sprayer boom comprising an inner boom section and an outer boom section connected together in a mid-portion, a support frame for supporting the inner end of the inner boom section, a vertical pivot between an outer end of the inner boom section and a plate fixed to an inner end of the outer boom section for permitting the outer boom section to pivot about a vertical pivot axis, an inner end of the inner boom section having a pivot bracket mounted thereon, for pivotally mounting the boom about a generally horizontal axis relative to the support frame, an upright support connected to the second plate at the inner end of the outer boom section, said upright support extending upwardly from the outer boom section, and having a cross member generally perpendicular to the longitudinal axis of the outer boom section at an upper end of the upright support, and a pair of elongated flexible links, one at each end of said cross member on the upright support spaced laterally outwardly from the outer boom section, said elongated flexible links extending to connect to the outer boom section at a position spaced outwardly from the vertical pivot.

5. The agricultural sprayer boom of claim 4, wherein the second plate at the inner end of the outer boom section is pivotally mounted to the plate on the outer end of the inner boom section about a generally horizontal pivot at a lower edge of the boom assembly, and a link spaced upwardly from the horizontal pivot and controlling movement about the horizontal pivot, said link being attached to the support frame for the inner end of the inner boom section at a position spaced above the connection of the inner boom section to the support frame, the second plate being pivotally mounted to the plate at the outer end of the inner boom about a second horizontal pivot, the inner boom section being pivotally mounted to the support frame such that as the support frame is raised and lowered, the orientation of the second plate pivoted to the plate at the outer end of the inner boom section remains substantially the same in space.

6. The agricultural sprayer boom of claim 4, wherein the outer end of the inner boom has a pivot assembly for pivotally mounting the upright support and cross member relative to the inner boom section about a horizontal pivot.

7. The agricultural sprayer boom assembly of claim 6, and an actuator for controlling movement of the outer boom section about the vertical pivot between the inner boom section and outer boom section.

8. An agricultural spray boom assembly comprising an inner boom section and an outer boom section, the outer boom section being mounted to an outer end of the inner boom about a generally horizontal axis, an upright support mounted at the outer end of the inner boom section, said support having a cross member at an upper end thereof that extends generally perpendicular to a longitudinal axis of the outer boom section, and a pair of elongated flexible tension carrying members from the opposite ends of the cross member being connected to the outer boom section at a location spaced from the outer end of the inner boom section, and at a substantially common attachment point to provide the flexible tension carrying members for resisting downward pivoting of the outer end of the outer boom section.

9. The agricultural boom of claim 8, wherein the inner boom section is pivotally mounted to a mounting frame, said pivotal mounting including a pivot plate, a hydraulic actuator connected between the pivot plate and the mounting frame, for moving the inner boom section about an upright axis between a working position and a folded position.

10. The agricultural sprayer boom of claim 9, wherein said pivot plate has a leg that is offset from and extends generally parallel to the inner boom section for a distance along a base end of the inner boom section, and said hydraulic cylinder being connected to the leg at an outer end thereof, and having an opposite end connected to the frame at a location offset from the upright axis.

11. The agricultural sprayer boom of claim 9, wherein a support frame is provided for an inner end of the inner boom section, the inner end being pivoted to the support frame section about both a horizontal and upright axis, and a second pair of cables having first ends connected to the support frame at connection points spaced along a line perpendicular to a central axis of the inner boom section, and having second ends connected to an outer end of the inner boom at a central location above the inner boom section.

* * * * *

UNITED STATES PATENT AND TRADEMARK OFFICE
CERTIFICATE OF CORRECTION

PATENT NO. : 6,719,213 B1
DATED : April 13, 2004
INVENTOR(S) : Edward P. Ferguson It is certified that error appears in the above-identified patent and that said Letters Patent is hereby corrected as shown below:

Column 6,
Line 58, "ends" should be -- end --

Column 7,
Lines 25, 37 and 45, delete "second"
Line 38, delete "the"
Line 46, after "plate" insert -- at the inner end of the outer boom section --

Column 8,
Line 1, delete "second"
Line 1, after "plate" insert -- at the inner end of the outer boom section --

Signed and Sealed this

Twenty-second Day of March, 2005

JON W. DUDAS
*Director of the United States Patent and Trademark Office*